United States Patent Office.

CHRISTOPHER G. DODGE, JR., OF NEW YORK, N. Y.

DISTEMPER-PAINT.

SPECIFICATION forming part of Letters Patent No. 223,895, dated January 27, 1880.

Application filed May 2, 1879.

*To all whom it may concern:*

Be it known that I, CHRISTOPHER G. DODGE, Jr., of the city, county, and State of New York, have invented a new and useful Improvement in Prepared Calcimine or Distemper Paints, of which the following is a specification.

The object of this invention is to furnish an improved calcimine, wall, or distemper paint, so prepared that it may be ready for use by the simple addition of water; and it consists in combining paris-white, glue, white soap, chloride of calcium, carbolic acid, and water in the proportions hereinafter specified.

In preparing the calcimine or distemper paints, I take three hundred and twenty pounds of paris-white or its equivalent, and add to it a prepared sizing composed of sixteen pounds of glue, sixteen pounds of white soap, eight pounds of chloride of calcium, and one hundred and sixty pounds of water. These ingredients are mixed and ground together until thoroughly intermingled, and to the mixture is then added one-eighth of a pound of pure carbolic acid.

The mixture thus prepared forms a calcimine, wall, or distemper paint of a consistency similar to white-lead in oil, and is put up into packages of various size for market, and is diluted with water when required for use.

The effect of the soap and calcium salt is to produce a wall-paint or calcimine that will work smooth under the brush; that will not peel, crack, or scale from the surface to which it may be applied; that will not decompose, putrefy, or grow offensive in odor by standing, and will act as a disinfectant to the surface to which it may be applied.

Calcimine, wall, or distemper paints compounded in the manner hereinbefore described, with the addition of coloring materials, may be made of various shades and tints, and the addition of the hereinbefore-described sizing to colored pigments or lakes forms what are termed "distemper" or "fresco" colors or "distemper" paints.

Having thus described my invention, I claim as new and desire to secure by Letters Patent—

An improved calcimine or distemper paint consisting of paris-white, glue, white soap, chloride of calcium, carbolic acid, and water, mixed in the proportions substantially as herein described, and for the purpose set forth.

CHRISTOPHER G. DODGE, JR.

Witnesses:
C. SEDGWICK,
J. H. SCARBOROUGH.